United States Patent
Ho et al.

(10) Patent No.: US 10,252,467 B2
(45) Date of Patent: Apr. 9, 2019

(54) CONTROL METHOD OF PRINTING TEMPERATURE AND DEVICE THEREOF

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Kwan Ho, New Taipei (TW); Yu-Chuan Chang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 396 days.

(21) Appl. No.: 14/870,015

(22) Filed: Sep. 30, 2015

(65) Prior Publication Data
US 2016/0339641 A1 Nov. 24, 2016

(30) Foreign Application Priority Data
May 22, 2015 (CN) .......................... 2015 1 0265969

(51) Int. Cl.
*B33Y 10/00* (2015.01)
*B33Y 40/00* (2015.01)
(Continued)

(52) U.S. Cl.
CPC .......... *B29C 64/393* (2017.08); *B29C 64/106* (2017.08); *B29C 64/118* (2017.08);
(Continued)

(58) Field of Classification Search
CPC ... B29C 64/106; B29C 64/386; B29C 64/393; B29C 67/0088; B29C 64/118;
(Continued)

(56) References Cited

U.S. PATENT DOCUMENTS

| | | | | |
|---|---|---|---|---|
| 5,623,297 A | * | 4/1997 | Austin | B41J 2/365 347/194 |
| 5,625,399 A | * | 4/1997 | Wiklof | B41J 2/355 347/195 |
| 6,827,416 B2 | * | 12/2004 | Matsumoto | B41J 2/04508 347/14 |
| 7,441,860 B2 | * | 10/2008 | Murakami | B41J 2/04515 347/17 |

(Continued)

FOREIGN PATENT DOCUMENTS

| | | | |
|---|---|---|---|
| CN | 104129077 | 11/2014 | |
| EP | 3395539 A1 | * 10/2018 | ........... B29C 64/393 |
| EP | 3395545 A1 | * 10/2018 | ........... B29C 64/118 |

OTHER PUBLICATIONS

"Office Action of Korean Counterpart Application," dated Apr. 10, 2017, with English translation thereof, p. 1-p. 9, in which the listed reference was cited.

*Primary Examiner* — Jennifer L Norton
(74) *Attorney, Agent, or Firm* — JCIPRNET

(57) ABSTRACT

A temperature control method of printing and a device thereof are provided, wherein the method and the device is adapted to a 3D printer which has a discharge nozzle. The control method includes the following steps. A temperature rule table is provided, and the temperature rule table is formed by a printing speed parameter and a discharge speed parameter of the 3D printer. At least one printing speed information and at least one discharge speed information are received. Corresponding temperature information is obtained from the temperature rule table according to the printing speed information and the discharge speed information. Further, a temperature of the discharge nozzle is adjusted according to the printing speed information, the discharge speed and the at least one temperature information.

10 Claims, 3 Drawing Sheets

(51) Int. Cl.
*B33Y 50/02* (2015.01)
*G05B 15/02* (2006.01)
*B29C 64/106* (2017.01)
*B29C 64/118* (2017.01)
*B29C 64/209* (2017.01)
*B29C 64/386* (2017.01)
*B29C 64/393* (2017.01)
*B29K 55/02* (2006.01)

(52) U.S. Cl.
CPC .......... *B29C 64/209* (2017.08); *B29C 64/386* (2017.08); *B33Y 10/00* (2014.12); *B33Y 40/00* (2014.12); *B33Y 50/02* (2014.12); *G05B 15/02* (2013.01); *B29K 2055/02* (2013.01)

(58) Field of Classification Search
CPC ... B29C 64/209; B29K 2055/02; B33Y 50/02; B33Y 10/00; B33Y 40/00; G05B 15/02
See application file for complete search history.

(56) References Cited

U.S. PATENT DOCUMENTS

| | | | | |
|---|---|---|---|---|
| 7,747,341 | B2* | 6/2010 | Dubois | H05K 1/16 700/119 |
| 9,010,903 | B2* | 4/2015 | Yokozawa | B41J 2/04515 347/14 |
| 9,482,586 | B2* | 11/2016 | Chen | B33Y 50/02 |
| 9,630,364 | B2* | 4/2017 | Ho | B29C 67/0088 |
| 9,931,837 | B2* | 4/2018 | Anderson | B41J 2/16579 |
| 9,937,663 | B1* | 4/2018 | Goss | B29C 67/0055 |
| 2002/0140753 | A1* | 10/2002 | Danzuka | B41J 2/04563 347/14 |
| 2015/0132425 | A1* | 5/2015 | Lacaze | B29C 67/0088 425/144 |
| 2016/0288395 | A1* | 10/2016 | Shen | B29C 47/802 |
| 2017/0252820 | A1* | 9/2017 | Myerberg | B22F 3/115 |
| 2018/0079139 | A1* | 3/2018 | Wang | B29C 67/00 |

* cited by examiner

CONTROL METHOD OF PRINTING TEMPERATURE AND DEVICE THEREOF

CROSS-REFERENCE TO RELATED APPLICATION

This application claims the priority benefit of China patent application serial no. 201510265969.6, filed on May 22, 2015. The entirety of the above-mentioned patent application is hereby incorporated by reference herein and made a part of the specification.

TECHNICAL FIELD

The present disclosure relates to a 3D printing technology, and more particularly, to a control method of printing temperature of a discharge nozzle in a 3D printer and a device thereof.

BACKGROUND

Along with advances in computer-aided manufacturing (CAM), the manufacturing industry has developed the three-dimensional (3D) printing technology, which is capable of rapidly fabricating products from an original design concept. In fact, the 3D printing (i.e., the three-dimensional printing) technology is a collective term referring to a series of rapid prototyping (RP) techniques, and the basic principle is laminate manufacture, wherein a rapid prototyping machine is used to form cross-sectional shapes of a workpiece in the X-Y plane through scanning, shift intermittently at a layer thickness in the Z coordinates, and ultimately form 3D objects. The 3D printing technology is applicable regardless of the geometric shapes and the RP technology produces excellent outputs in particular for complex parts, which saves efforts and processing time significantly. The 3D printing technology is capable of presenting an object of a digital 3D model designed by means of computer-aided design (CAD) software in the least time for the user to touch and actually feel the geometry of the model, or even to test the assemblability of the parts and possible functions.

The 3D printing technology includes various types. The Fused Deposition Modeling (FDM) method is one type of the 3D printing technology, and the FDM method is widely adopted for its cheap fabrication cost and simple device structure. Main parameters related to a 3D printer in the printing technology using the 3D FDM method may include: a printing layer depth, a printing speed and a printing temperature, which are the three major factors for influencing overall printing quality. The printing layer depth directly influences a discharge speed (e.g., the discharge speed is faster if the layer depth is thicker, and thus a printing result thereof has lower definition). The printing speed influences a stability for the discharge nozzle to discharge material (e.g., when the printing speed is faster, the discharge nozzle is required to discharge material more stably). The printing temperature is a very important factor that influences the printing quality, and the printing temperature varies based on characteristics of coil materials. When a proper printing temperature is used, the discharge nozzle may stably discharge material while providing a smooth surface quality.

In general, the simplest method to achieve the preferable printing quality is to continuously maintain the coil material at a constant temperature. However, because a discharge nozzle design, a material characteristic, a discharge speed and a printing speed are correlated to one another, the printing quality of the 3D printer cannot be further improved simply by printing in constant temperature. Accordingly, it is a difficult problem for the manufacturers as how to dynamically adjust the temperature of the discharge nozzle so that the printing result may be fabricated in higher definition and more quickly.

SUMMARY

The present disclosure provides a control method of printing temperature, which is capable of dynamically deducing a printing temperature according to a printing speed and a discharge speed. A nozzle of a 3D printer may discharge material more stably by dynamically changing the printing temperature, so as to further improve the printing quality.

The present disclosure provides a control method of printing temperature, which is adapted to control a printing temperature of a discharge nozzle of a 3D printer, and the control method includes: providing a temperature rule table, wherein the temperature rule table is formed by a printing speed parameter and a plurality of printing speed ranges corresponding thereto and a discharge speed parameter and a plurality of discharge speed ranges corresponding thereto of the 3D printer; receiving at least one printing speed information and at least one discharge speed information; obtaining at least one corresponding temperature information from the temperature rule table according to the printing speed ranges of the printing speed parameter and the discharge speed ranges of the discharge speed parameter which are corresponding to the at least one printing speed information and the at least one discharge speed information respectively; and adjusting the printing temperature of the discharge nozzle according to the printing speed information, the discharge speed information and the at least one temperature information.

The present disclosure provides a control device of printing temperature, which is adapted to a 3D printer, and the device includes a processor, a storage unit and a discharge nozzle. Herein, the storage unit is configured to store a temperature rule table, and the temperature rule table is formed by a printing speed parameter and a plurality of printing speed ranges corresponding thereto and a discharge speed parameter and a plurality of discharge speed ranges corresponding thereto of the 3D printer. The processor receives a command including at least one printing speed information and at least one discharge speed information, obtains at least one corresponding temperature information from the temperature rule table according to the printing speed ranges of the printing speed parameter and the discharge speed ranges of the discharge speed parameter which are corresponding to the at least one printing speed information and the at least one discharge speed information respectively, and adjusts a printing temperature of the discharge speed according to the printing speed information, the discharge speed information and the at least one temperature information.

Based on the above, according to the control method of printing temperature and the device thereof as proposed by the present disclosure, the printing temperature is dynamically deduced by using a deduction method of a fuzzy theory according to the printing speed, the discharge speed and the temperature rule table. Also, the discharge nozzle of the 3D printer may discharge material more stably without getting blocked by the printing material by dynamically changing the printing temperature, so as to further improve the printing quality.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
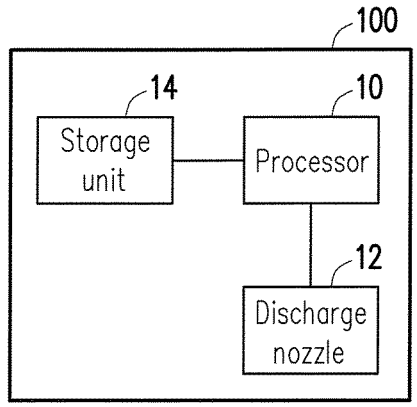
FIG. 1 is a schematic diagram illustrating a control device of printing temperature according to an exemplary embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure is directed to a control method of printing speed and a device thereof, which are capable of calculating an optimal printing temperature of a 3D printer by a deduction formula (which is designed by using a fuzzy theory) for a temperature rule table and a printing temperature according to a printing speed and a discharge speed of the 3D printer. Accordingly, the stability for the discharge nozzle to discharge material may be improved by controlling a temperature of the discharge nozzle based on embodiments of the present disclosure, so as to further improve the printing quality of the 3D printer. Several embodiments are provided below to further describe the spirit of the present disclosure.

FIG. 1 is a schematic diagram illustrating a control device of printing temperature according to an exemplary embodiment. Referring to FIG. 1, a control device 100 is disposed in a 3D printer which has a discharge nozzle. Specifically, the control device 100 of the present embodiment is, for example, a control element in a fused deposition modeling 3D printing device, which is adapted to adjust the printing temperature according to the printing speed and the discharge speed and print a 3D object according to a digital 3D model information. In the present embodiment, the control device 100 includes a processor 10, a discharge nozzle 12 and a storage unit 14, wherein the processor 10 is electrically connected to the discharge nozzle 12 and the storage unit 14. Aforesaid digital 3D model information may be a digital 3D image file.

The digital 3D image file may be constructed by a computer host (not illustrated) through the computer-aided design (CAD) or animation modeling software. Users may also obtain the digital 3D image file through other communication technologies. The processor 10 may read and process the digital 3D image file through a storage element (e.g., a hard disk, an optical disc, a flash drive, etc.). Further, the processor 10 may be further configured to receive a command comprising the printing speed information and the discharge speed information inputted by the 3D printer, so as to execute the control method of printing temperature as proposed by the present disclosure. It should be understood that, the processor 10 is, for example, a hardware device composed of logical circuit units, which are capable of executing the control method of printing temperature as proposed by the present disclosure. Further, the processor 10 may also be program codes stored in the storage unit 14 of the control device 100, which are used to execute the control method of printing temperature as proposed by the present disclosure, but the present disclosure is not limited thereto. In the present embodiment, the processor 10 may be a central processing unit, a FPGA or a multipurpose chip which are capable of loading programming codes for executing the corresponding functions.

In the present embodiment, the 3D printer may allow the discharge nozzle 12 to move within an accommodating space, and the discharge nozzle 12 may perform a 3D printing corresponding to the digital 3D model according to the 3D model information outputted by the processor 10. Further, the discharge nozzle 12 includes a temperature control equipment (not illustrated), and the temperature control equipment is capable of adjusting the printing temperature of the discharge nozzle 12 according to printing temperature information provided by the processor 10.

In the present embodiment, the storage unit 14 may be used to store a temperature rule table as proposed by the present disclosure (detailed forming method thereof will be described later) and provide the temperature rule table to the processor 10, and the storage unit 14 may also be used to store the program codes of the control method of printing temperature as proposed by the present disclosure. In the present embodiment, the storage unit 14 may be a SRAM, a DRAM, or any memory or storage device capable of storing electronic signals or data.

Figure 2:
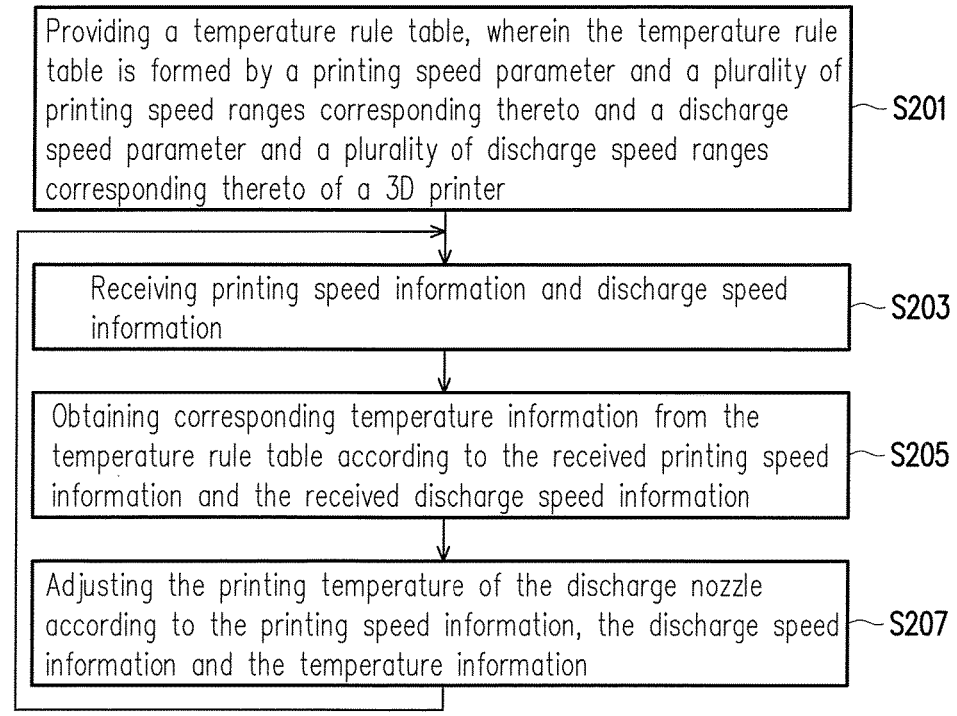
FIG. 2 is a flowchart illustrating a control method of printing temperature according to an exemplary embodiment.

FIG. 2 is a flowchart illustrating a control method of printing temperature according to an exemplary embodiment. Referring to FIG. 1 and FIG. 2 together, in step S201, the storage unit 14 provides the temperature rule table to the processor 10 (i.e., the processor 10 obtains the temperature rule table from the storage unit 14). The temperature rule table is formed by a printing speed parameter and a plurality of printing speed ranges corresponding thereto and a discharge speed parameter and a plurality of discharge speed ranges corresponding thereto of the 3D printer. In the present embodiment, the temperature rule table may be represented by Table 1 below.

TABLE 1

| | Printing speed | | |
|---|---|---|---|
| Discharge speed | Low speed range ($U_1$) | Standard speed range ($U_2$) | High speed range ($U_3$) |
| Low speed range ($V_1$) | Low temperature ($P_1$) | Low temperature ($P_4$) | Standard temperature ($P_7$) |

TABLE 1-continued

| | Printing speed | | |
|---|---|---|---|
| Discharge speed | Low speed range ($U_1$) | Standard speed range ($U_2$) | High speed range ($U_3$) |
| Standard speed range ($V_2$) | Low temperature ($P_2$) | Standard temperature ($P_5$) | High temperature ($P_8$) |
| High speed range ($V_3$) | Standard temperature ($P_3$) | High temperature ($P_6$) | High temperature ($P_9$) |

In Table 1, the multiple printing speed ranges corresponding to the printing speed parameter are mainly decided by a motor control and a mechanism stability of the 3D printer. The multiple discharge speed ranges corresponding to the discharge speed parameter are mainly decided by a discharge nozzle design and a material characteristic of the 3D printer. The multiple corresponding printing temperatures corresponding to the printing speed parameter and the discharge speed parameter are mainly defined according to printing materials. However, person who applying the present embodiment should understand that the printing speed ranges, the discharge speed ranges and the printing temperatures may also decided according to other parameters or conditions instead of being limited only to the aforesaid conditions.

Figure 3:
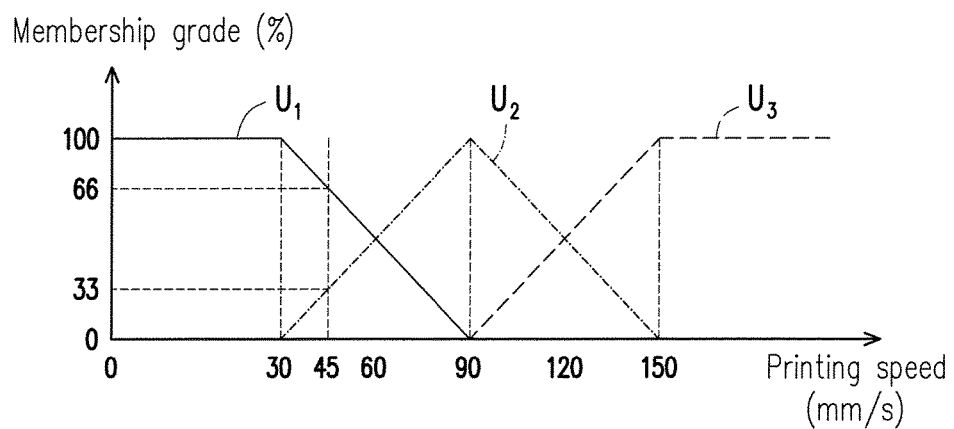
FIG. 3 is a schematic diagram illustrating a membership function of the printing speed according to an exemplary embodiment.

FIG. 3 is a schematic diagram illustrating a membership function of the printing speed according to an exemplary embodiment. Referring to FIG. 3, in the present exemplary embodiment, manufacturers of the 3D printer may define the multiple printing speed ranges corresponding to the printing speed parameter of the 3D printer according to the motor control and the mechanism stability of the 3D printer during the manufacturing process of the 3D printer. In the present exemplary embodiment, as shown by Table 1 and the FIG. 3, the printing speed ranges of the printing speed parameter are defined into a low speed range, a standard speed range and a high speed range, and those printing speed ranges may be partially overlapped with each other. In addition, each of the printing speed ranges is also corresponding to one membership function, and the membership function is a membership grade (or a similarity) of one printing speed corresponding to the printing speed range.

Herein, it should be noted that, in the embodiments of the present disclosure, the printing temperature of the 3D printer is deduced by using a deduction method of a fuzzy theory together with calculations by formulas. Herein, the spirit of the fuzzy theory aims to convert an input value into a language that is artificially predefined or easy to understand (also known as a fuzzy linguistic value) by using a fuzzy theory function. Specifically, aforesaid printing speed ranges are defined into the low speed range, the standard speed range and the high speed range. The low speed range, the standard speed range and the high speed range are of the artificially defined language, and the membership grades (or known as the similarities) of the printing speed corresponding to the printing speed ranges may be obtained by inputting the printing speed into the fuzzy membership functions respectively corresponding to the low speed, the standard speed range and the high speed range. In other words, a size of the membership grade represents a degree of the printing speed belonging to (or similar to) the range.

Referring to FIG. 3, for example, a horizontal axis refers to the printing speeds (mm/s), and a vertical axis refers to function values (%) (also known as the membership grade) of the membership functions of the printing speeds corresponding to the printing speed ranges. With respect to the membership function $U_1$ of the printing speed range being the low speed range, the membership grade of the printing speed belonging to the low speed range is 100% when the printing speed is less than or equal to 30 mm/s, the membership grade of the printing speed belonging to the low speed range is linearly decreased when the printing speed is greater than 30 mm/s and less than 90 mm/s, and the membership grade of the printing speed belonging to the low speed range is 0% when the printing speed is equal to or greater than 90 mm/s.

With respect to the membership function $U_2$ of the printing speed range being the standard speed range, the membership grade of the printing speed belonging to the standard speed range is 0% when the printing speed is less than or equal to 30 mm/s. The membership grade of the printing speed belonging to the standard speed range is linearly increased when the printing speed is greater than 30 mm/s and less than 90 mm/s, and the membership grade of the printing speed belonging to the standard speed range is 100% when the printing speed is equal to 90 mm/s. The membership grade of the printing speed belonging to the standard speed range is linearly decreased when the printing speed is greater than 90 mm/s and less than 150 mm/s, and the membership grade of the printing speed belonging to the standard speed range is 0% when the printing speed is equal to or greater than 150 mm/s.

With respect to the membership function $U_3$ of the printing speed range being the high speed range, the membership grade of the printing speed belonging to the high speed range is 0% when the printing speed is less than or equal to 90 mm/s. The membership grade of the printing speed belonging to the high speed range is linearly increased when the printing speed is greater than 90 mm/s and less than 150 mm/s. The membership grade of the printing speed belonging to the high speed range is 100% when the printing speed is equal to or greater than 150 mm/s.

It should be understood that, the multiple printing speed ranges may be partially overlapped with each other. For example, in view of FIG. 3, the printing speed belonging to the low speed range is in a range of equal to or greater than 0 mm/s and less than 90 mm/s, the printing speed belonging to the standard speed range is in a range of greater than 30 mm/s and less than 150 mm/s. Accordingly, the low speed range and the standard speed range are overlapped with each other when the printing speed is in a range of greater than 30 mm/s and less than 90 mm/s. In other words, when one specific printing speed falls in the printing speed range of greater than 30 mm/s and less than 90 mm/s, the specific printing speed is corresponding to both the low speed range and the standard speed range, and the specific printing speed obtains both the membership grade of the membership function corresponding to the low speed range and the membership grade of the membership function corresponding to the standard speed range. In the case where the printing speed is 45 mm/s, as shown in FIG. 3, the printing speed being 45 mm/s is corresponding to both the low speed range and the standard speed range, and the printing speed obtains both the membership grade $U_1(45)$ of the membership function $U_1$ corresponding to the low speed range (with the value of 66%) and the membership grade $U_2(45)$ of the membership function $U_2$ corresponding to the standard speed range (with the value of 33%).

Similarly, as shown in FIG. 3, the standard speed range and the high speed range are overlapped with each other when the printing speed is in a range of greater than 90 mm/s and less than 150 mm/s. In other words, when one specific printing speed falls in the printing speed range of greater than 90 mm/s and less than 150 mm/s, the specific printing speed is corresponding to both the standard speed range and the high speed range, and the specific printing speed obtains both the membership grade of the membership function corresponding to the standard speed range and the membership grade of the membership function corresponding to the high speed range.

In the present exemplary embodiment, the membership function of the printing speed range is a triangular fuzzy membership function. However, in other exemplary embodiments, the membership function of the printing speed range may also be other membership functions, such as a Gaussian membership function or a trapezoidal membership function and the like. In addition, an amount of the multiple ranges corresponding to the printing speed parameter is not particularly limited in the present disclosure.

Figure 4:
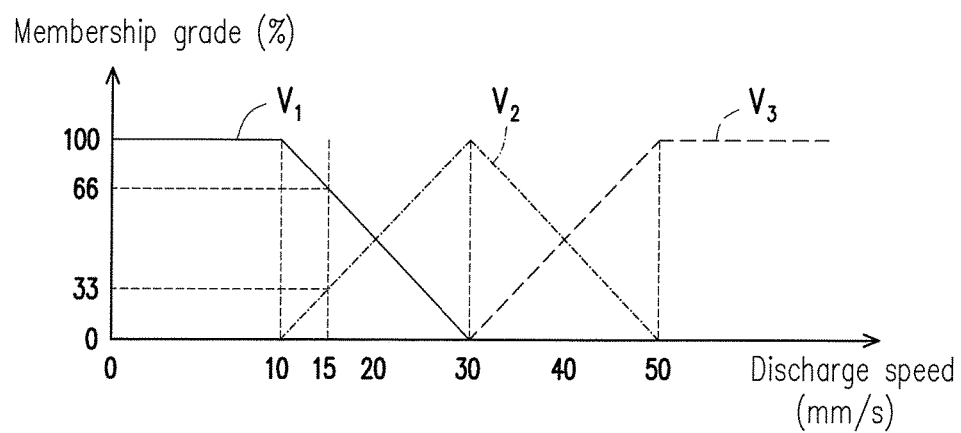
FIG. 4 is a schematic diagram illustrating a membership function of the discharge speed according to an exemplary embodiment.

FIG. 4 is a schematic diagram illustrating a membership function of the discharge speed according to an exemplary embodiment. Referring to FIG. 4, in the present exemplary embodiment, manufacturers of the 3D printer may define the multiple discharge speed ranges corresponding to the discharge speed parameter of the 3D printer according to the discharge nozzle design and the material characteristic of the 3D printer during the manufacturing process of the 3D printer. In the present exemplary embodiment, as shown by Table 1, the discharge speed ranges of the discharge speed parameter are defined into a low speed range, a standard speed range and a high speed range. In addition, each of the discharge speed ranges is also corresponding to one membership function, and the membership function is a membership grade (or a similarity) of one discharge speed corresponding to the discharge speed range.

Referring to FIG. 4, for example, a horizontal axis refers to the discharge speeds (mm/s), and a vertical axis refers to function values (%) (also known as a membership grade) of the membership functions of the discharge speeds corresponding to the discharge speed ranges. With respect to the membership function $V_1$ of the discharge speed range being the low speed range, the membership grade of the discharge speed belonging to the low speed range is 100% when the discharge speed is less than or equal to 10 mm/s, the membership grade of the discharge speed belonging to the low speed range is linearly decreased when the discharge speed is greater than 10 mm/s and less than 30 mm/s, and the membership grade of the discharge speed belonging to the low speed range is 0% when the printing speed is equal to or greater than 30 mm/s.

With respect to the membership function $V_2$ of the discharge speed range being the standard speed range, the membership grade of the discharge speed belonging to the standard speed range is 0% when the discharge speed is less than or equal to 10 mm/s. The membership grade of the discharge speed belonging to the standard speed range is linearly increased when the discharge speed is greater than 10 mm/s and less than 30 mm/s, and the membership grade of the discharge speed belonging to the standard speed range is 100% when the discharge speed is equal to 30 mm/s. The membership grade of the discharge speed belonging to the standard speed range is linearly decreased when the discharge speed is greater than 30 mm/s and less than 50 mm/s, and the membership grade of the discharge speed belonging to the standard speed range is 0% when the discharge speed is equal to or greater than 50 mm/s.

With respect to the membership function $V_3$ of the discharge speed range being the high speed range, the membership grade of the discharge speed belonging to the high speed range is 0% when the discharge speed is less than or equal to 30 mm/s. The membership grade of the discharge speed belonging to the high speed range is linearly increased when the discharge speed is greater than 30 mm/s and less than 50 mm/s. The membership grade of the discharge speed belonging to the high speed range is 100% when the discharge speed is equal to or greater than 50 mm/s.

It should be understood that, the multiple discharge speed ranges may be partially overlapped with each other. For example, in view of FIG. 4, the discharge speed belonging to the low speed range is in a range of equal to or greater than 0 mm/s and less than 30 mm/s, the discharge speed belonging to the discharge speed range is in a range of greater than 10 mm/s and less than 50 mm/s. Accordingly, the low speed range and the standard speed range are overlapped with each other when the discharge speed is in a range of greater than 10 mm/s and less than 30 mm/s. In other words, when one specific discharge speed falls in the discharge speed range of greater than 10 mm/s and less than 30 mm/s, the specific discharge speed is corresponding to both the low speed range and the standard speed range, and the specific discharge speed obtains both the membership grade of the membership function corresponding to the low speed range and the membership grade of the membership function corresponding to the standard speed range. In the case where the discharge speed is 15 mm/s, as shown in FIG. 4, when the discharge speed is 15 mm/s, the discharge speed is corresponding to the low speed range and the standard speed range separately, and the discharge speed obtains both the membership grade $V_1(15)$ of the membership function $V_1$ corresponding to the low speed range (with the value of 66%) and the membership grade $V_2(15)$ of the membership function $V_2$ corresponding to the standard speed range (with the value of 33%).

Similarly, as shown in FIG. 4, the standard speed range and the high speed range are overlapped with each other when the discharge speed is in a range of greater than 30 mm/s and less than 50 mm/s. In other words, when one specific discharge speed falls in the discharge speed range of greater than 30 mm/s and less than 50 mm/s, the specific discharge speed is corresponding to both the standard speed range and the high speed range, and the specific discharge speed obtains both the membership grade of the membership function corresponding to the standard speed range and the membership grade of the membership function corresponding to the high speed range.

In the present exemplary embodiment, the membership function of the discharge speed range is a triangular fuzzy membership function. However, in other exemplary embodiments, the membership function of the discharge speed range may also be other membership functions, such as a Gaussian membership function or a trapezoidal membership function and the like. In addition, an amount of the multiple ranges corresponding to the discharge speed parameter is not particularly limited in the present disclosure.

Figure 5:
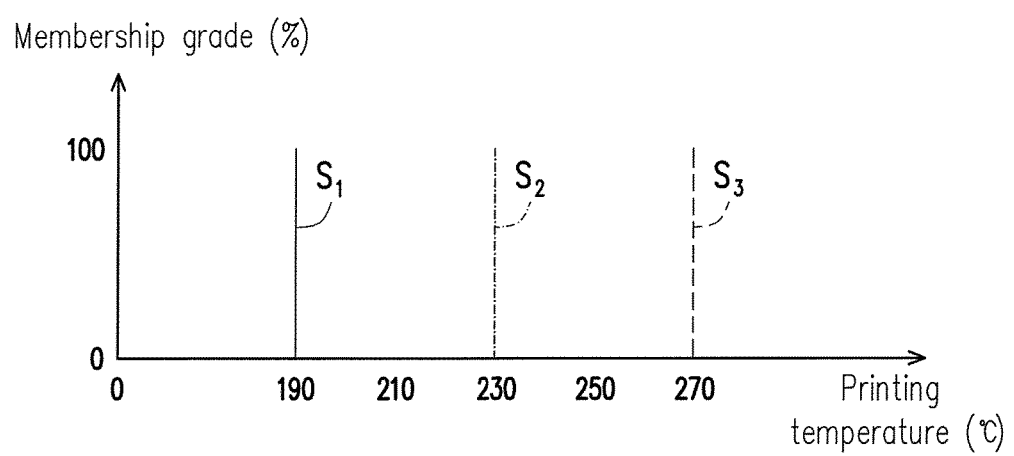
FIG. 5 is a schematic diagram illustrating a membership function of the printing temperature according to an exemplary embodiment.

FIG. 5 is a schematic diagram illustrating a membership function of the printing temperature according to an exemplary embodiment. Referring to FIG. 5, in the present exemplary embodiment, manufacturers of the 3D printer may define a plurality of printing temperature types corresponding to the discharge nozzle of the 3D printer according to characteristics of printing materials of the 3D printer during the manufacturing process of the 3D printer. In the present exemplary embodiment, the printing temperature types may further be defined into a 'low temperature', a 'standard temperature' and a 'high temperature'. Each of the printing temperature types is corresponding to a membership function of the printing temperature.

Referring to FIG. 5, for example, a horizontal axis refers to the printing temperature (° C.), and a vertical axis refers to function values (%) (also known as a membership grade) of the membership functions of the printing temperature types corresponding to the printing temperature. In the present exemplary embodiment, each of the printing temperature types is defined by a single value. In the case where the printing material is an Acrylonitrile Butadiene Styrene (ABS) resin, with respect to the 'low temperature', the printing temperature belonging to the 'low temperature' is simply 190° C. For the membership function $S_1$ corresponding to the 'low temperature', the membership grade $S_1(190)$ is 100% only when the printing temperature is 190° C., whereas the membership grade of the printing temperature belonging to the 'low temperature' is 0% when the printing temperature is of other temperatures.

With respect to the standard temperature, the printing temperature belonging to the 'standard temperature' is simply 230° C. For the membership function $S_2$ corresponding to the 'standard temperature', the membership grade $S_2(230)$ is 100% only when the printing temperature is 230° C., whereas the membership grade of the printing temperature belonging to the 'standard temperature' is 0% when the printing temperature is of other temperatures.

With respect to the 'high temperature', the printing temperature belonging to the 'high temperature' is simply 270° C. For the membership function $S_3$ corresponding to the 'high temperature', the membership grade $S_3(270)$ is 100% only when the printing temperature is 270° C., whereas the membership grade of the printing temperature belonging to the 'high temperature' is 0% when the printing temperature is of other temperatures.

In the present exemplary embodiment, the membership function of the printing temperature types is a single value fuzzy membership function. However, in other exemplary embodiments, the membership function of the printing temperature types may also be other membership functions, such as a triangular membership function, a Gaussian membership function or a trapezoidal membership function and the like.

It should be noted that, the printing temperature is defined according to the corresponding printing material. In the present exemplary embodiment, a printing temperature belonging to the 'standard temperature' of the ABS resin is 230° C., and the membership function values of a printing temperature belonging to the 'low temperature' and printing temperature belonging to the 'high temperature' are 190° C. and 270° C. respectively. In another exemplary embodiment, if a Polylactic Acid (PLA) is used as the printing material, the standard printing temperature is 190° C., and the membership function values of the printing temperature belonging to the 'low temperature' and the printing temperature belonging to the 'high temperature' may also be adjusted corresponding to the change of the printing material. The printing materials are not particularly limited in the embodiments of the present disclosure.

Referring back to FIG. 1 and FIG. 2 together, the temperature rule table provided to the processor 10 by the storage unit 14 in step S201 may be generated by the aforesaid method. In other words, the temperature rule table is formed by the printing speed parameter and the printing speed ranges corresponding thereto, the discharge speed parameter and the discharge speed ranges corresponding thereto and the printing temperature types corresponding to the printing materials of the 3D printer, and the temperature rule table is, for example, as shown by Table 1.

In step S203, the processor 10 receives printing speed information and discharge speed information. Herein, the printing speed information and the discharge speed information may be obtained by manual input from users, or may be dynamically changed and inputted to the processor 10 by a software program, which are not particularly limited in the present disclosure.

In step S205, the processor 10 obtains corresponding temperature information from the temperature rule table according to the received printing speed information and the received discharge speed information.

Take FIG. 3, FIG. 4, FIG. 5 and Table 1 as an example, in the case where the received printing speed information X is 45 mm/s and the received discharge speed information Y is 15 mm/s, the processor 10 obtains the printing speed range to which the printing speed information corresponding to 45 mm/s belongs and the corresponding membership function value according to the membership functions of the printing speeds as illustrated in FIG. 3. As shown in FIG. 3, when the printing speed is equal to 45 mm/s, the printing speed is belonging to both the low speed range and the standard speed range, and the printing speed has the membership grade $U_1$ (45) belonging to the low speed range being 66% and the membership grade $U_2(45)$ belonging to the standard speed being 33%.

The processor 10 obtains the discharge speed range to which the discharge speed corresponding to 15 mm/s belongs and the corresponding membership function value according to the membership functions of the discharge speeds as illustrated in FIG. 4. As shown in FIG. 4, when the discharge speed is equal to 15 mm/s, the discharge speed is belonging to both the low speed range and the standard speed range, and the discharge speed has the membership grade $V_1(15)$ belonging to the low speed range being 66% and the membership grade $V_2(15)$ belonging to the standard speed being 33%.

Thereafter, the processor 10 obtains the corresponding temperature information from Table 1 according to the printing speed ranges corresponding to the membership function values of the printing speed information being 45 mm/s and the discharge speed ranges corresponding to the membership function values of the discharge speed information being 15 mm/s. As described above, when the printing speed information is equal to 45 mm/s, the printing speed ranges corresponding to the printing speed parameter are the low speed range and the standard speed range; and when the discharge speed is equal to 15 mm/s, the discharge speed ranges corresponding to the discharge speed parameter are the low speed range and the standard speed range. The corresponding printing temperature types may be obtained from the temperature rule table according to the printing speed ranges corresponding to the printing speed and the discharge speed ranges corresponding to the discharge speed. In view of Table 1, when the printing speed information is 45 mm/s and belongs to the low speed range of the printing speed parameter and when the discharge speed information is 15 mm/s and belongs to the low speed range of the discharge speed parameter, a position of the printing temperature type corresponding to a portion corresponding to the printing speed being the low speed range (i.e., a position where the printing speed parameter is the low speed range ($U_1$) in Table 1) and a position corresponding to the discharge speed parameter being the low speed range (i.e., a position where the discharge speed parameter is the low speed range ($V_1$) in Table 1) may be obtained from Table 1, and the corresponding printing temperature type is the 'low temperature' (i.e., a position where the printing temperature is the low temperature ($P_1$) in Table 1).

When the printing speed information is 45 mm/s and belongs to the low speed range of the printing speed parameter and when the discharge speed information is 15 mm/s and belongs to the standard speed range of the discharge speed parameter, a position of the printing temperature type corresponding to a position corresponding to the printing speed being the low speed range (i.e., a position where the printing speed parameter is the low speed range ($U_1$) in Table 1) and a position corresponding to the discharge speed parameter being the standard speed range (i.e., a position where the discharge speed parameter is the standard speed range ($V_2$) in Table 1) may be obtained from Table 1, and the corresponding printing temperature type is the 'low temperature' (i.e., a position where the printing temperature is the low temperature ($P_2$) in Table 1).

When the printing speed information is 45 mm/s and belongs to the standard speed range of the printing speed parameter and when the discharge speed information is equal to 15 mm/s and belongs to the low speed range of the discharge speed parameter, a position of the printing temperature type corresponding to a position corresponding to the printing speed being the standard speed range (i.e., a position where the printing speed parameter is the standard speed range ($U_2$) in Table 1) and a position corresponding to the discharge speed parameter being the low speed range (i.e., a position where the discharge speed parameter is the low speed range ($V_1$) in Table 1) may be obtained from Table 1, and the corresponding printing temperature type is the low temperature (i.e., a position where the printing temperature is the low temperature ($P_4$) in Table 1).

When the printing speed information is 45 mm/s and belongs to the standard speed range of the printing speed parameter and when the discharge speed information is equal to 15 mm/s and belongs to the standard speed range of the discharge speed parameter, a position of the printing temperature type corresponding to a position corresponding to the printing speed being the standard speed range (i.e., a position where the printing speed parameter is the standard speed range ($U_2$) in Table 1) and a position corresponding to the discharge speed parameter being the standard speed range (i.e., a position where the discharge speed parameter is the standard speed range ($V_2$) in Table 1) may be obtained from Table 1, and the corresponding printing temperature type is the standard temperature (i.e., a position where the printing temperature is the standard temperature ($P_5$) in Table 1).

As described above, in the present exemplary embodiment, the low printing temperature is 190° C., the standard printing temperature is 230° C. and the high printing temperature is 270° C.

Referring back to FIG. 1 and FIG. 2 together, subsequently, in step S207, the processor 10 adjusts the printing temperature of the discharge nozzle 12 according to the printing speed information, the discharge speed information and the corresponding temperature information obtained from the temperature rule table.

In an embodiment, the processor 10 calculates the printing temperature information according to a weighted mean formula. The weighted mean formula is:

$$T = \Sigma_{i,j,k}(MIN(U_i(X), V_j(Y)) \times D(S_k)) / \Sigma_{i,j,k}(MIN(U_i(X), V_j(Y)))$$ Formula (1)

wherein T is the printing temperature; MIN is for finding a minimal value; X is the printing speed info illation, and the printing speed information X is equal to 45 mm/s in the present exemplary embodiment; Y is the discharge speed information, and the discharge speed information Y is equal to 15 mm/s in the present exemplary embodiment; i is at least one first position on the printing speed ranges in the temperature rule table corresponding to the printing speed information, and because the printing speed has the membership grade $U_1(45)$ of the low speed range being 66% and the membership grade $U_2$ (45) of the standard speed range being 33% when the printing speed is equal to 45 mm/s in the present exemplary embodiment, the at least one first position refers to positions corresponding to the low speed range ($U_1$) and the standard speed range ($U_2$) of the printing speed parameter in Table 1; j is at least one second position on the discharge speed ranges in the temperature rule table corresponding to the discharge speed information, and because the discharge speed has the membership grade $V_1(15)$ of the low speed range being 66% and the membership grade $V_2(15)$ of the standard speed range being 33% when the discharge speed is equal to 15 mm/s in the present exemplary embodiment, the at least one second position refers to positions corresponding to the low speed range ($V_1$) and the standard speed range ($V_2$) of the discharge speed parameter in Table 1; k is a temperature type corresponding to a third position (the third position is corresponding to the first position and the second position in the temperature rule table) and the third position refers to the positions of the low temperature ($P_1$), the low temperature ($P_2$), the low temperature ($P_4$) and the standard temperature ($P_5$) in Table 1 according to the printing speed ranges corresponding to the printing speed and the discharge speed ranges corresponding to the discharge speed. In addition, in the present exemplary embodiment, it is assumed that the printing temperature type being the 'low temperature' is a first type (i.e., k=1), the printing temperature type being the 'standard temperature' is a second type (i.e., k=2), and the printing temperature type being the 'high temperature' is a third type (i.e., k=3).

$U_i(X)$ is the membership function value (i.e., the similarity) of the printing speed information with respect to the printing speed range corresponding to the first position, and when the printing speed is equal to 45 mm/s in the present exemplary embodiment, the printing speed has the membership grade $U_1(45)$ belonging to the low speed range being 66% and the membership grade $U_2(45)$ belonging to the standard range being 33%; $V_j(Y)$ is the membership function value (i.e., the similarity) of the discharge speed information with respect to the discharge speed range corresponding to the second position, and when the discharge speed is equal to 15 mm/s in the present exemplary embodiment, the discharge speed has the membership grade $V_1(15)$ belonging to the low speed being 66% and the membership grade $V_2(15)$ belonging to standard speed being 33%; $S_k$ is the temperature information corresponding to the temperature type of the third position in the temperature rule table, and in the present exemplary embodiment, said temperature information refers to "Low temperature" corresponding to the position at the low temperature ($P_1$) in Table 1 (i.e., the low temperature corresponding to the temperature of first type $S_1$), "Low temperature" corresponding to the position at the low temperature ($P_2$) in Table 1 (i.e., the low temperature corresponding to the temperature of the first type $S_1$), "Low temperature" corresponding to the position at the low temperature ($P_4$) in Table 1 (i.e., the low temperature corresponding to the temperature of the first type $S_1$), "Standard temperature" corresponding to the position at the standard temperature ($P_5$) in Table 1 (i.e., the standard temperature corresponding to the temperature of the second type $S_2$); and $D(S_k)$ is the temperature of the temperature information corresponding to the temperature type, such as 190° C. corresponding to a low temperature type (i.e., $S_1$), 230° C. corresponding to a standard temperature type (i.e., $S_2$) and 270° C. corresponding to a high temperature type (i.e., $S_3$).

According to the aforesaid examples, when the printing speed information is equal to 45 mm/s and the discharge speed information is equal to 15 mm/s, these values are inputted to Formula (1) for a detailed calculation provided below:

the printing temperature $T$=(MIN($U_1$(45),$V_1$(15))×D($S_1$)+MIN($U_1$(45),$V_2$(15))×D($S_1$)+MIN($U_2$(45),$V_1$(15))×D($S_1$)+MIN($U_2$(45),$V_2$(15))×D($S_2$))/(MIN($U_1$(45),$V_1$(15))+MIN($U_1$(45),$V_2$(15))+MIN($U_2$(45),$V_1$(15))+MIN($U_2$(45),$V_2$(15)))= (MIN(0.66,0.66)×190+MIN(0.66,0.33)×190+MIN(0.33,0.66)×190+MIN(0.33,0.33)×230)/(0.66+0.33+0.33+0.33)=(125.4+62.7+62.7+75.9)/1.65=198.

Through aforesaid weighted mean formula, it can be calculated that, when the printing speed information is equal to 45 mm/s and the discharge speed information is equal to 15 mm/s in the case where the printing material is the ABS resin, an optimal printing temperature is 198° C.

However, in another exemplary embodiment, the optimal printing temperature may also be obtained by directly searching the temperature rule table. For example, when the received printing speed information is only corresponding to one printing speed range corresponding to the printing speed parameter in the temperature rule table and the discharge speed information is also only corresponding to one discharge speed ranges in the temperature rule table, the printing temperature and the discharge speed are only corresponding to one printing temperature information in the temperature rule table. As such, according to the temperature corresponding to the printing temperature information, the processor 10 may use said temperature to adjust the current optimal printing temperature of the printing nozzle.

For instance, referring back to FIG. 3, FIG. 4 and Table 1, the printing speed has the membership grade $U_1$(20) belonging to the low speed range of the printing speed parameter being 100% when the printing speed is 20 mm/s and the discharge speed has the membership grade $V_1$(5) belonging to the low speed range of the discharge speed parameter being 100% when the discharge speed is 5 mm/s. Because the printing speed infatuation being 20 mm/s is only corresponding to the low speed range ($U_1$) of the printing speed parameter in Table 1 and the discharge speed being 20 mm/s is only corresponding to the low speed range ($V_1$) of the discharge speed in Table 1, the processor 10 may obtain the printing temperature type corresponding to the position corresponding to the printing speed parameter being the low speed range ($U_1$) and the position corresponding to the low speed range ($V_1$) of the discharge speed parameter from Table 1, and the corresponding printing temperature type is the low temperature (i.e., the position where the printing temperature is the low temperature ($P_1$) in Table 1). Subsequently, according to the temperature corresponding to the printing temperature type, the processor 10 may directly set this temperature as the optimal printing temperature of the discharge nozzle. In the present embodiment, because the printing temperature corresponding to the low temperature is 190° C., the processor 10 may directly set that temperature as the optimal printing temperature.

Referring back to FIG. 1 and FIG. 2 together, the processor 10 transmits printing temperature information generated by aforesaid method to the discharge nozzle 12. The discharge nozzle 12 adjusts the printing temperature of the discharge nozzle according to this printing temperature information, so as to adjust the most appropriate sprinting temperature for the current printing material. Thereafter, the process may return back to step S203, where the new printing speed information and the new discharge speed information may be received again in order to continue dynamically adjusting the printing temperature.

In summary, according to the control method of printing temperature as proposed by the present disclosure, the printing temperature may be deduced by the membership functions of the fuzzy theory and the fuzzy linguistic values according to the printing speed, the discharge speed and the temperature rule table. Also, the discharge nozzle of the 3D printer may discharge material more stably without getting blocked by the printing material by dynamically changing the printing temperature, so as to further improve the printing quality.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A control method of printing temperature, to control a printing temperature of a discharge nozzle of a 3D printer to print a 3D object, and comprising:
    providing a temperature rule table in a non-transitory storage medium, wherein the temperature rule table comprises a plurality of combinations among a plurality of printing speed ranges and a plurality of discharge speed ranges as the plurality of combinations are all possible combinations between each of the plurality of discharge speed ranges and each of the plurality of printing speed ranges, and each of the possible combinations corresponds to a temperature information;
    receiving, by processor, a command inputted by the 3D printer comprising a printing speed information and a discharge speed information, wherein the printing speed information and the discharge speed information fall within one of the plurality of printing speed ranges and one of the plurality of discharge speed ranges, respectively;
    obtaining the temperature information from the temperature rule table, by the processor, according to the printing speed ranges corresponding to the printing speed information and the discharge speed ranges corresponding to the discharge speed information;
    calculating the printing temperature of the discharge nozzle, by the processor, using the printing speed information, the discharge speed information and the temperature information;
    dynamically adjusting the printing temperature of the discharge nozzle, by the processor, using the calculated printing temperature; and
    printing the 3D object by discharging a printing material from the discharge nozzle of the 3D printer using the dynamically adjusted printing temperature of the discharge nozzle.

2. The control method according to claim 1, wherein a temperature corresponding to the temperature information in the temperature rule table is defined according to an optimal printing temperature of the printing material.

3. The control method according to claim 1, wherein each of the printing speed ranges and the discharge speed ranges has a corresponding membership function, and the step of adjusting the printing temperature of the discharge nozzle according to the printing speed information, the discharge speed information and the temperature information comprises:

calculating the printing temperature by a weighted mean formula according to the printing speed information, the discharge speed information, the membership functions of the printing speed ranges corresponding to the printing speed information, the membership functions of the discharge speed ranges corresponding to the discharge speed information, and the temperature information.

4. The control method according to claim 3, wherein the weighted mean formula is:

$$T = \frac{\sum_{i,j,k}(MIN(U_i(X), V_j(Y)) \times D(S_k))}{\sum_{i,j,k}(MIN(U_i(X), V_j(Y)))},$$

wherein T is the printing temperature, MIN is for finding a minimal value, X is the printing speed information, Y is the discharge speed information, i is a first position on the printing speed ranges in the temperature rule table corresponding to the printing speed information, j is a second position on the discharge speed ranges in the temperature rule table corresponding to the discharge speed information, k is a temperature type corresponding to a third position in the temperature rule table according to the first position and the second position, $U_i(X)$ is the membership function of the printing speed information with respect to the printing speed range corresponding to the first position, $V_j(Y)$ is the membership function of the discharge speed information with respect to the discharge speed range corresponding to the second position, $S_k$ is a corresponding temperature information corresponding to a corresponding temperature type, and $D(S_k)$ is a temperature corresponding to the corresponding temperature information.

5. The control method according to claim 1, wherein the 3D printer is a fused deposition modeling 3D printing device.

6. A control device of printing temperature, to control a 3D printer for printing of a 3D object, and comprising:

a discharge nozzle, disposed on the 3D printer;

a non-transitory storage medium, configured to store a temperature rule table, wherein the temperature rule table comprises a plurality of combinations among a plurality of printing speed ranges and a plurality of discharge speed ranges as the plurality of combinations are all possible combinations between each of the plurality of discharge speed ranges and each of the plurality of printing speed ranges, and each of the possible combinations corresponds to a temperature information; and a processor, electrically connected to the discharge nozzle and the storage unit, wherein the processor receives a command inputted by the 3D printer the command comprising a printing speed information and a discharge speed information, the printing speed information and the discharge speed information fall within one of the plurality of printing speed ranges and one of the plurality of discharge speed ranges, respectively;

obtains the temperature information from the temperature rue table according to the printing speed ranges corresponding to the printing speed information and the discharge speed ranges corresponding to the discharge speed information;

calculates the printing temperature of the discharge nozzle using the printing speed information, the discharge speed information and the temperature information;

dynamically adjusts the printing temperature of the discharge nozzle using the calculated printing temperature; and prints the 3D object by discharging a printing material from the discharge nozzle of the 3D printer using the dynamically adjusted printing temperature of the discharge nozzle.

7. The control device according to claim 6, wherein a temperature corresponding to the temperature information in the temperature rule table is defined according to an optimal printing temperature of the printing material.

8. The control device according to claim 6, wherein each of the printing speed ranges and the discharge speed ranges has a corresponding membership function, and the processor calculates the printing temperature by a weighted mean formula according to the printing speed information, the discharge speed information, the membership functions of the printing speed ranges corresponding to the printing speed information, the membership functions of the discharge speed ranges corresponding to the discharge speed information, and the temperature information.

9. The control device according to claim 8, wherein the weighted mean formula is $$T = \frac{\sum_{i,j,k}(MIN(U_i(X), V_j(Y)) \times D(S_k))}{\sum_{i,j,k}(MIN(U_i(X), V_j(Y)))},$$

wherein T is the printing temperature, MIN is for finding a minimal value, X is the printing speed information, Y is the discharge speed information, i is a first position on the printing speed ranges in the temperature rule table corresponding to the a printing speed information, j is a second position on the discharge speed ranges in the temperature rule table corresponding to the discharge speed information, k is a temperature type corresponding to a third position in the temperature rule table according to the first position and the second position, $U_i(X)$ is the membership function of the printing speed information with respect to the printing speed range corresponding to the first position, $V_j(Y)$ is the membership function of the discharge speed information with respect to the discharge speed range corresponding to the second position, $S_k$ is a corresponding temperature information corresponding to a corresponding temperature type, and $D(S_k)$ is a temperature corresponding to the corresponding temperature information.

10. The control device according to claim 6, wherein the 3D printer is a fused deposition modeling 3D printing device.

* * * * *